UNITED STATES PATENT OFFICE.

BENJAMIN C. BRIGGS, OF PARIS, MAINE.

FERTILIZER.

SPECIFICATION forming part of Letters Patent No. 298,939, dated May 20, 1884.

Application filed December 1, 1883. (No specimens.)

*To all whom it may concern:*

Be it known that I, BENJAMIN C. BRIGGS, residing in Paris, in the county of Oxford and State of Maine, have invented certain new and useful Improvements in Fertilizing Compounds; and I do hereby declare that the following is a full, clear, and exact description of the invention, which will enable others skilled in the art to which it appertains to make and use the same.

This invention has relation to a new and useful composition of matter to be used for fertilizing purposes, which shall be in every way calculated to act as an efficient agent for enriching the soil and increasing its productiveness, so that better crops may be produced and harvested.

Following are enumerated the ingredients used in the manufacture of my new and useful fertilizing compound, viz: bone-meal or dissolved bone, one barrel; plaster, one barrel; ashes, two barrels; hen-manure or guano, two barrels; muck, two barrels; urine or chamber-lye, two barrels; salt, one bushel.

The manner and method of mixing and treating the several ingredients above set forth are as follows: The bone-meal and ashes and one barrel of urine or chamber-lye are first mixed together. This mixture is allowed to stand about four weeks, so that the urine and ashes may thoroughly dissolve the bone-meal. During the four weeks this mixture is carefully stirred up and worked over every three or four days. At the expiration of the four weeks, one barrel of urine or chamber-lye, two barrels of hen-manure or guano, two barrels of muck, and one bushel of salt are added to the first mixture. All the ingredients composing the fertilizer are now brought together. The compound is then thoroughly mixed, and is ready for use, just as any other fertilizer.

For purposes of preservation or transportation, the mixture should be placed in tight barrels or boxes, to prevent the air from acting upon it to weaken its strength.

In the above description I have set out the method of manipulating and treating the ingredients when bone-meal is used.

In using my fertilizer the soil is prepared just the same as for any of the numerous fertilizers now sold upon the market.

I am aware that it is not new to use the above ingredients for the purpose of fertilizing; but I do not know that the ingredients now named have ever before been combined together for this purpose, or in the proportions named, or by the process or in the manner set forth.

What I claim as my invention, and desire to secure by Letters Patent, is—

The within-described fertilizing compound, composed of bone-meal or plaster, ashes, hen-manure or guano, muck, chamber-lye, and salt, all the different ingredients treated as described, and united in the proportion substantially as set forth.

In testimony that I claim the foregoing as my own I have affixed my signature in the presence of two witnesses.

BENJAMIN C. $\overset{\text{his}}{\times}$ BRIGGS.
mark.

Witnesses:
O. K. GEINST,
SCOTT E. BRIGGS.